Figure 1:
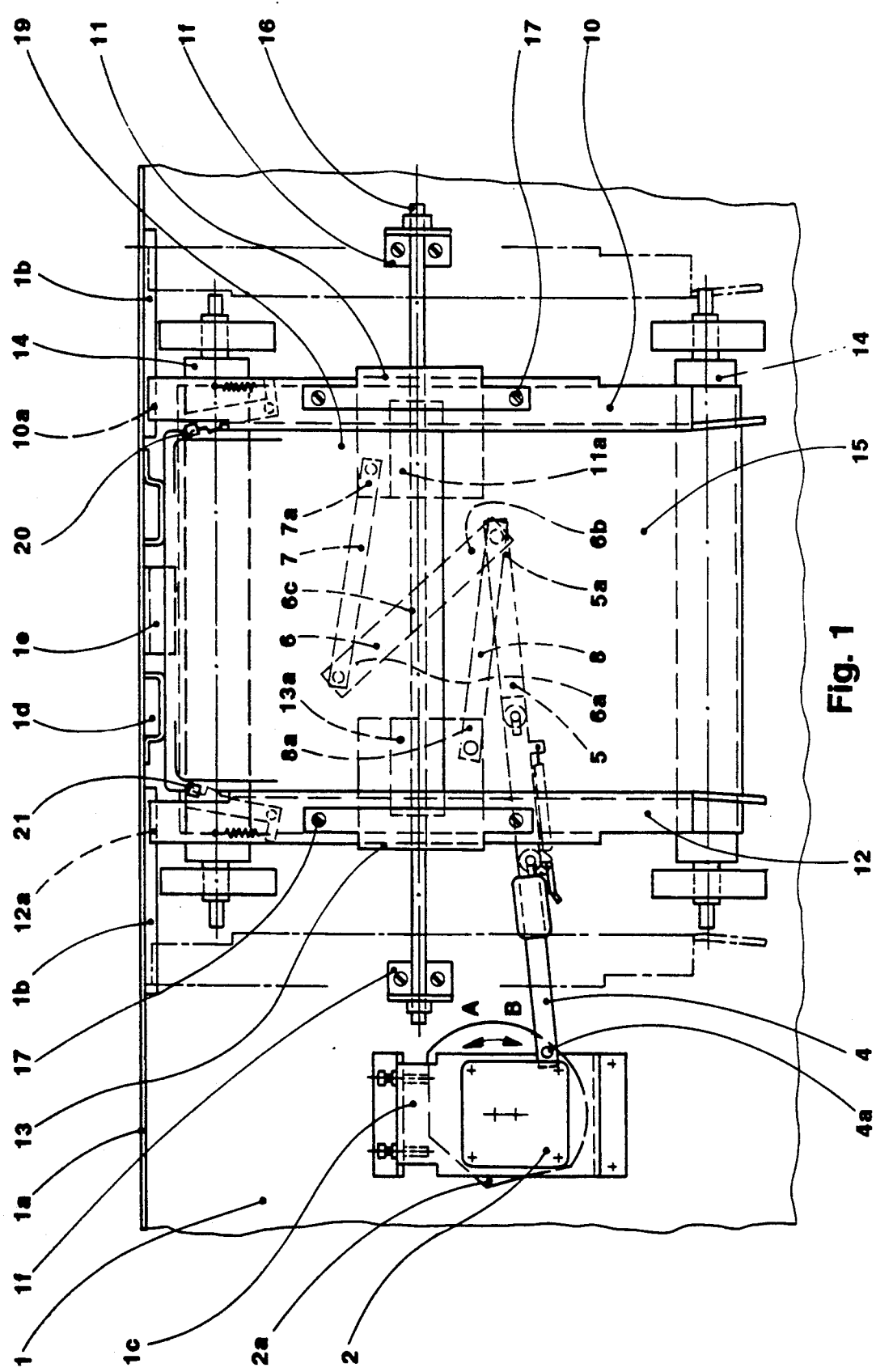

United States Patent [19]

Mirlieb et al.

[11] Patent Number: 5,007,075
[45] Date of Patent: Apr. 9, 1991

[54] HOLD-DOWN DEVICE FOR A CASSETTE

[75] Inventors: Bernd Mirlieb, Fellbach; Heinrich Killguss, Kornwestheim, both of Fed. Rep. of Germany

[73] Assignee: Eastman Kodak Company, Rochester, N.Y.

[21] Appl. No.: 438,428

[22] PCT Filed: May 9, 1988

[86] PCT No.: PCT/EP88/00403
§ 371 Date: Nov. 8, 1989
§ 102(e) Date: Nov. 8, 1989

[87] PCT Pub. No.: WO88/09002
PCT Pub. Date: Nov. 17, 1988

[30] Foreign Application Priority Data

May 11, 1987 [DE] Fed. Rep. of Germany ..... 87/06746

[51] Int. Cl.⁵ .................. A61B 6/14; G03B 42/04; G03B 42/02
[52] U.S. Cl. .................................... 378/172; 378/169; 378/170; 378/181; 378/182; 378/187; 378/167
[58] Field of Search ............... 378/169, 167, 170, 172, 378/173, 174, 175, 187, 81, 182; 29/806; 360/99.06

[56] References Cited

U.S. PATENT DOCUMENTS 4,541,173 9/1985 Sakuma et al. .................. 029/806
4,815,066 3/1989 Horvath ........................ 360/99.06
4,866,551 9/1989 Kishimoto et al. ............. 360/99.06

FOREIGN PATENT DOCUMENTS 3223301 12/1967 Fed. Rep. of Germany ...... 378/182

Primary Examiner—Edward P. Westin
Assistant Examiner—Don Wong
Attorney, Agent, or Firm—G. Herman Childress

[57] ABSTRACT

In a device for holding down the lower cassette portion (19a) of an X-ray film cassette which is located in a cassette unloading and reloading apparatus, a hold-down lever (20, 21) is mounted to each of two parallely guided bars (10, 12) movable towards and away from each other respectively, said hold-down lever being pivotable into, and out of the transport path of the X-ray film cassette to accurately position said cassette. Each hold-down lever (20, 21) comprises a control arm (20a, 21a) resting against each of the two side walls (19d, 19e) of the upper cassette portion (19c). Since the control arms (20a, 21a) are upwardly inclined such that they form control surfaces facing the side walls (19d, 19e) of the upper cassette portion (19c), the hold-down levers (20, 21) are held in engagement with the lower cassette portion (19a) when the upper cassette portion (19c) is in its open position and are disengaged from the lower cassette portion (19a) when the upper cassette portion (19c) is in its closed position.

2 Claims, 2 Drawing Sheets

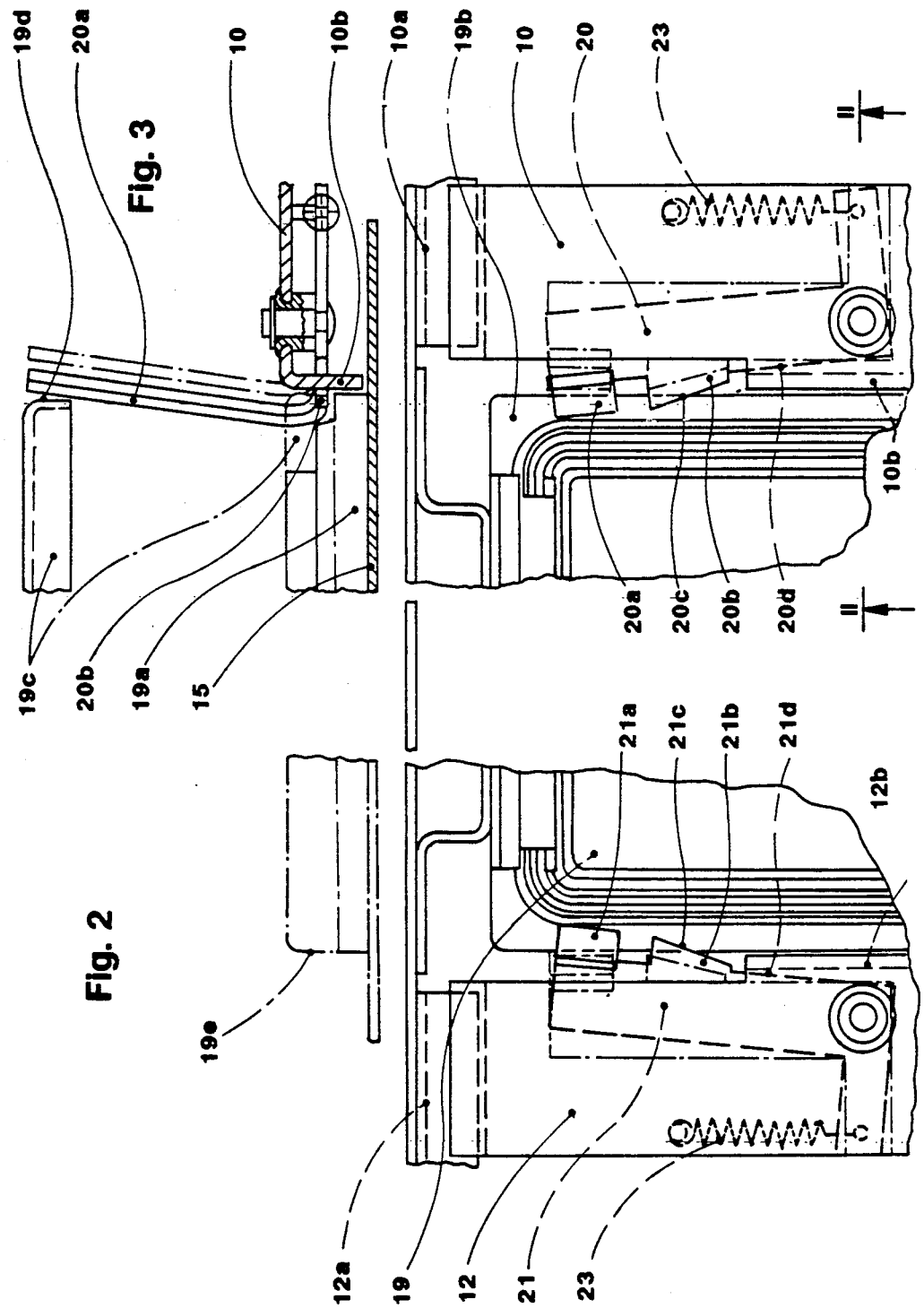

HOLD-DOWN DEVICE FOR A CASSETTE

The innovation relates to a device for holding down the lower cassette portion of an X-ray film cassette which is located in a cassette unloading and reloading apparatus and can be positioned by means of two parallely guided bars movable towards and away from each other respectively.

A device is known (DE-OS 306 720) in which an X-ray film cassette is accurately positioned between two parallely guided bars pulled towards each other by a tension spring and transported by means of motor-driven rollers on a receiving plate towards a final abutment in a cassette unloading and reloading station. At the free ends of the bars, which are situated in the area of the final abutment, vertically shiftable claws are mounted which are pressed downwardly by a spring and which each rest on a stationary abutment and are thus held upwardly in opposition to the spring force so that the bent portions of the claws are located above the front edge of the frame of the X-ray film cassette resting against the final abutment. When the upper cassette portion is to be opened, the receiving plate together with the X-ray film cassette and the bars is lifted to an inclined position, the claws also being lifted from the stationary abutments and pressed downwardly by means of their springs As a result the two claws are moved onto the frame of the X-ray film cassette and hold the cassette down on the receiving plate situated in its inclined position.

This known arrangement is disadvantageous in that additional control means are required for keeping the known hold-down devices out of engagement with an X-ray film cassette positioned on the final abutment in an unloading and reloading station.

It is the object of the innovation to further develop and improve the known cassette hold-down device such that no additional means are required for its control.

In accordance with the innovation this object is attained in that a hold-down lever, which can be pivoted into and out of the transport path of the X-ray film cassette, is mounted to each bar and in that each hold-down lever comprises a control arm resting against a side wall of the upper cassette portion.

In detail the innovation provides that the control arms of the two hold-down levers extend upwardly in an inclined position and form control surfaces facing the side walls of the upper cassette portion such that the hold-down levers are held in engagement with the lower cassette portion when the upper cassette portion has been pivoted to its open position and are disengaged from the lower cassette portion when the upper cassette portion has been pivoted to its closed position.

Other features and advantages can be inferred from the further subclaims as well as from the description of an embodiment illustrated in the drawings in which:

FIG. 1 is a plan view of the subject matter of the innovation in a cassette positioning device, FIG. 2 is a plan view of the subject matter according to FIG. 1 in an enlarged representation, and FIG. 3 is a sectional view along line II—II of the subject matter according to FIG. 2.

In an apparatus 1 for removing exposed film sheets from X-ray film cassettes of different sizes and for reloading the cassettes with unexposed film sheets, a device for positioning the X-ray film cassettes is arranged in the area of the unloading and reloading station. This positioning device comprises two parallely guided bars 10 and 12 which are movable towards and away from each other respectively by means of a symmetrical lever arrangement 6, 7, 8 in combination with a driven rod 4, 5. A transport belt 15 transports an X-ray film cassette 19 from an input point to the loading and reloading station. Transport belt 15 is placed around two spindles 14, one of which is driven. In the present embodiment an X-ray film cassette 19 of small size is illustrated.

The bars 10 and 12 are mounted by means of screws 17 to angle plates 11 and 13. Each angle plate 11 and 13 respectively is shiftably mounted by means of a bushing 11a and 13a respectively on a guide shaft 16 held between two mounting angles if provided on the apparatus. At the ends of the bars 10 and 12, which extend into the interior of the apparatus, guide grooves 10a and 12a are provided by means of which the bars 10 and 12 are additionally guided for sliding movement on guide rails 1b arranged on a partition wall 1a of the apparatus. Numeral 1e denotes an inclined cassette ramp located on partition wall 1a and numeral 1d two cassette abutments mounted to said partition wall.

A symmetrical lever arrangement is provided for actuating the two bars 10, 12, said arrangement being positioned between said bars and consisting of a two-arm lever 6 centrally mounted for rotation about a stationary pin 6c. A further lever arm 7 pointing to the right is hinged to one free lever end 6a and a second lever arm 8 pointing to the left is hinged to the other free lever end 6b. The free ends 7a and 8a of the two lever arms 7 and 8 are hingedly connected to the angle plates 11 and 13 which support the bars 10 and 12.

A drive motor 2 is screwed to a holding angle 1c provided on the apparatus. The free end 4a of a portion 4 of a rod consisting of two oppositely movable portions 4 and 5 is hingedly connected to a crank disk 2a seated on the motor shaft and rotated by the motor to and fro in the direction of the arrows "A" and "B". The other free end 5a of portion 5 of the rod directly engages the hinge between lever 6 and the lever arm 8 which points to the left.

In the area of each of the free ends of the two bars 10 and 12 (the ends which extend into the interior of the apparatus) a hold-down lever 20 and 21 is mounted so as to be pivotable into and out of the transport path of the X-ray film cassette 19. The hold-down levers have respective control arm portions 20a and 21a (FIGS. 2 and 3). The control arm portions extend upwardly and are slightly inclined outwardly in the direction towards the bars 10 and 12 so that they form diverging inclined control surfaces facing the side walls 19d and 19e of the upper cassette portion 19c.

Hold-down noses 20b and 21b are provided on the respective hold-down levers 20 and 21. The hold-down noses each have inclined surfaces 20c and 21c extending in the transport direction of the X-ray film cassette Both hold-down levers 20 and 21 are biased by a tension spring 23 for pivotal movement in the inward direction. The hold-down levers rest with their inner surfaces 20d and 21d against bent-off portions 10b and 12b of the bars 10 and 12 (FIGS. 2 and 3).

When an X-ray film cassette 19 is transported from the input point to the unloading and reloading station, contact of the front side of the cassette with one of the abutments 1d causes motor 2 to be actuated by switch means not illustrated in detail. By means of crank disk 2a rotating in the direction "A" and the rod hinged to it, motor 2 actuates the symmetrical lever arrangement 6, 7 and 8, the bars 10 and 12 being moved towards each other from their initial position shown in FIG. 1 in dash-dotted lines. Directly before the bars 10 and 12 make contact with the side walls of the cassette, the control arms 20a and 21a of the hold-down levers 20 and 21 engage the side walls 19d and 19e of the upper cassette portion 19c. The hold-down levers 20 and 21 are pivoted back to the positions shown in dash-dotted lines in FIGS. 2 and 3. When the upper cassette portion 19c is pivoted by means not illustrated into its open position, the hold-down levers 20 and 21 are brought into engagement with the lower cassette portion 19a via their obliquely disposed control arms 20a and 21a resting against the side walls 19d and 19e of the upper cassette portion 19c. In this position of the two hold-down levers the inner surfaces 20d and 21d again make contact with the bent-off portions 10b and 12b of the bars 10 and 12 and the hold-down noses 20b and 21b are positioned above the stepped edge 19b of lower cassette portion 19a.

After the exposed film sheets have been removed from the X-ray film cassette and the cassette has been reloaded with unexposed film sheets, the side walls 19d and 19e of the upper cassette portion 19c slide along the inclined control arms 20a and 21a while the upper cassette portion is being pivoted to its closed position, the inclined position of said arms causing the hold-down levers 20 and 21 to become once again disengaged from the lower cassette portion 19a.

If a large size X-ray film cassette is introduced into the apparatus, there is only a small space available between the side walls of the cassette and the bars 10, 12 moved apart and assuming the position shown in dash-dotted lines in FIG. 1. If a large size X-ray film cassette is introduced it may, if necessary, be brought directly into contact with one of the bars 10 or 12. During transport the side walls of the upper cassette portion slide along the inclined surfaces 20c and 21c of the hold-down noses 20b and 21b with the hold-down levers being pivoted back at the same time.

We claim:

1. In x-ray film cassette handling apparatus in which cassettes having upper and lower parts for enclosing the film are centered by parallel lateral edge guide bars and the upper cassette part is raised for loading film into the cassette and unloading film from the cassette; the improvement comprising:

pivoted means carried by said edge guide bars and engageable with lateral edges of a cassette for holding the lower cassette part down when the upper part is raised, means for biasing said pivoted means toward the cassette, said pivoted means having a first portion for overlying an edge of the lower cassette part to hold down that part, and a second portion to engage the upper cassette part, said second portion of said pivoted means extending above said edge guide bars and having upwardly diverging inclined surfaced facing the cassette edges, which surfaces are engaged by the lateral edges of said upper cassette part when said part is raised, downward closing movement of said upper cassette part exerting separating pressure on said diverging surfaces, causing said pivoted means to retract said first portion away from said cassette.

2. Apparatus as set forth in claim 1, further comprising:

said first portion of said pivoted means normally extending into the space between said edge guide bars, said pivoted means being moved apart to a retracted position against the force of said biasing means as said second portion of said pivoted means and said upper cassette part come into engagement with each other, said pivoted means remaining in retracted position until said upper cassette part is moved toward raised position, engagement of said upper cassette part with the diverging surfaces of said second portion of said pivoted means, during said movement, freeing said pivoted means for movement by said biasing means toward the cassette, whereupon said first portion of said pivoted means engages, and holds down, said lower cassette part.

* * * * *